Patented Sept. 8, 1953

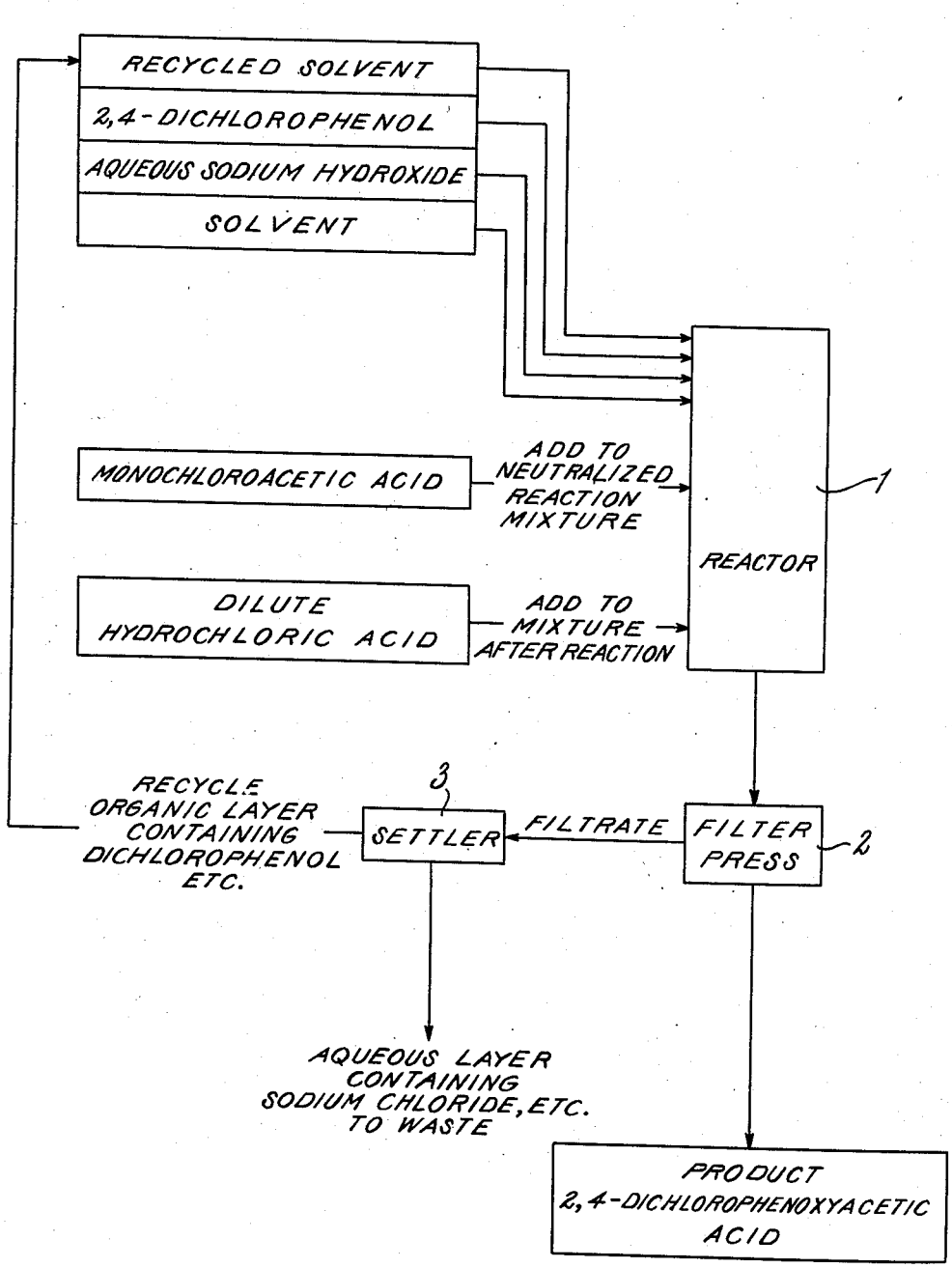

2,651,659

UNITED STATES PATENT OFFICE 2,651,659

PREPARATION OF 2,4-DICHLOROPHENOXY-ACETIC ACID

John C. R. Warren, Elmira, Ontario, and Marshall Kulka, Guelph, Ontario, Canada, assignors to United States Rubber Company, New York, N. Y., a corporation of New Jersey Application January 31, 1952, Serial No. 269,194

2 Claims. (Cl. 260—521)

This invention relates to the preparation of 2,4-dichlorophenoxyacetic acid. This compound has come into widespread use as a weed killer, and it has been desired to produce it by more economical and more efficient methods than those heretofore known.

The preparation of 2,4-dichlorophenoxyacetic acid has heretofore been carried out in the presence of water by reacting an alkali metal salt of 2,4-dichlorophenol and an alkali metal salt of monochloroacetic acid to yield the alkali metal salt of 2,4-dichlorophenoxyacetic acid. The reaction involved may be expressed as follows:

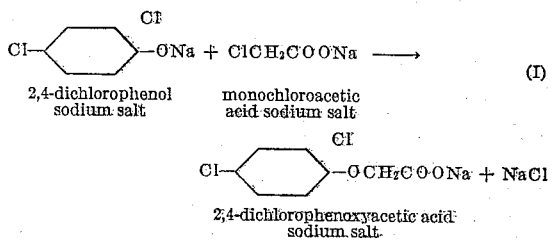

Addition of an acid to the resulting salt produces the desired 2,4-dichlorophenoxyacetic acid as follows:

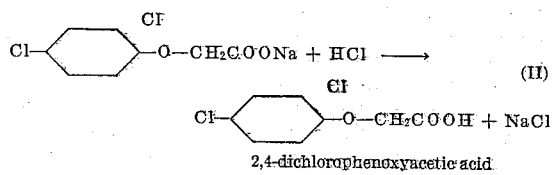

The yield of the desired product obtainable with the prior art methods has been limited by the fact that an appreciable fraction of the sodium monochloroacetate hydrolyzes according to the following equation to form a glycollic acid:

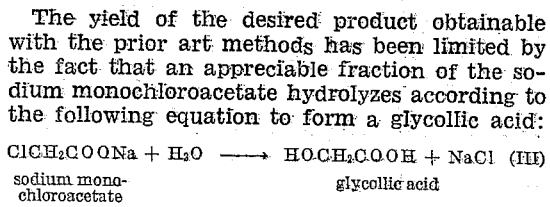

This objectionable hydrolysis, with consequent loss of yield, takes place even if the sodium 2,4-dichlorophenolate reactant is employed in a molar excess quantity.

It has now been discovered that when the reaction is carried out by mixing at least 2 moles of the alkali metal salt of 2,4-dichlorophenol as such, with 1 mole of the monochloroacetic acid as such, the reaction proceeds very rapidly and in almost quantitative yield. In this process, there is liberated by an exchange reaction 1 mole of free unneutralized 2,4-dichlorophenol, while there is simultaneously produced 1 mole of each of the desired reacting salts, viz., 1 mole of the alkali metal salt of 2,4-dichlorophenol and 1 mole of the alkali metal salt of monochloroacetic acid, as shown in the following equation:

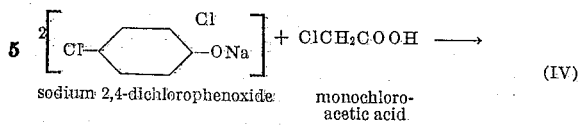

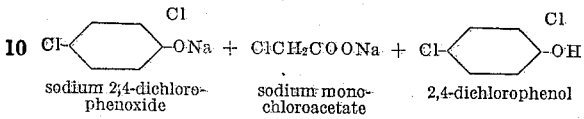

In the process represented by the foregoing equation, the invention provides a means for neutralizing the starting monochloroacetic acid to the desired reacting salt under conditions which allow only a minimum of hydrolysis to glycollic acid, and when the salt of the monochloroacetic acid is thus formed it is immediately available for virtually instantaneous reaction with the 2,4-dichlorophenolate salt, thereby further minimizing any opportunity for hydrolysis. The result is a rapid reaction and an unusually high yield of the desired product. The invention therefore provides a practical method for making 2,4-dichlorophenoxyacetic acid under conditions which produce substantially higher yields than have heretofore been considered possible, due to the fact that hydrolysis of the alkali metal salt of monochloroacetic acid is largely suppressed, with resulting higher conversion of this material to the desired product.

An embodiment of the invention is shown in the accompanying drawing, which is a diagrammatic flow sheet representing the essential steps in one method of carrying out the invention.

Referring to the drawing, a typical procedure involving the present invention comprises adding to a reactor 1, containing a suitable inert organic liquid reaction medium, such as monochlorobenzene, at least 2 moles of 2,4-dichlorophenol. The organic solvent is usually employed in about two times the weight of the 2,4-dichlorophenol. To this mixture is added a hot aqueous solution of sodium hydroxide in amount sufficient to neutralize at least 2 moles of the 2,4-dichlorophenol. The solvent is usually composed partly of recycled solvent from a previous batch. The amount of sodium hydroxide employed should be sufficient to neutralize all of the 2,4-dichlorophenol present plus any 2,4-dichlorophenoxyacetic acid or other acids that may be present in the recycled solvent carrier, but an excess of free alkali in the reaction mixture should be avoided. The heat of neutralization raises the temperature of the reaction mixture. Upon completion of the neutralization reaction, 1 mole of monochloroacetic acid is then added to the reactor, and this acid reacts with the sodium 2,4-dichlorophenoxide, as indicated in Equation IV above, to form sodium monochloroacetate together with an equivalent amount of free 2,4-dichlorophenol. The monochloroacetic acid is conveniently added in the form of a warm solution in the organic carrier liquid. If the monochloroacetic acid is added in the pure form it should be added, with suitable agitation, at a comparatively moderate temperature, e. g., 30 to 50° C. for best results. When the monochloroacetic acid is added in the form of a solution in the organic carrier liquid, it may be added more rapidly, and at a more elevated temperature, if desired. The reaction mixture is then refluxed for a period of about 1 hour, which is usually more than sufficient to bring the reaction of Equation I above to completion. In fact the reaction is generally substantially complete within ¼ hour. The reaction mixture is then cooled and acidified, as with dilute aqueous sulfuric acid, and the mixture is then cooled further to effect precipitation of the 2,4-dichlorophenoxyacetic acid formed in accordance with Equation II above. The mixture is then passed through a filter press 2 to remove the product, and the filtrate is passed to a suitable settler 3 in which the organic layer of the filtrate is allowed to separate from the aqueous layer. The organic layer may be recycled, and the aqueous layer may be discarded.

In this procedure there is employed at least 2 moles, and preferably from 2 to 2.2 moles, of sodium 2,4-dichlorophenoxide for each mole of monochloroacetic acid. Although large quantities, e. g., 3 moles, of 2,4-dichlorophenoxide may be used, there is ordinarily no added advantage in doing so, and for reasons of economy, not more than 2.2 moles are usually employed. Although it is preferred to employ the sodium salt on account of cheapness and availability, other alkali metal salts such as those of potassium or lithium may be employed. The alkali metal salt of 2,4-dichlorophenol may, if desired, be prepared beforehand in a separate reaction vessel. For example, one convenient procedure is to simply commingle an aqueous sodium hydroxide solution with 2,4-dichlorophenol, and drop the resulting hot solution on a flaked heating drum, producing flakes of sodium 2,4-dichlorophenoxide to be used as the raw material in the foregoing process.

The organic liquid carrier which is employed as the reaction medium in the practice of the present invention should have the following characteristics. It should be inert under the conditions of reaction. It should be a good solvent for the 2,4-dichlorophenol. It should exhibit a considerably lower solubility for the 2,4-dichlorophenoxyacetic acid product than for the 2,4-dichlorophenol. It should be substantially water-insoluble so that it forms a separate liquid phase after acidification of the reaction mixture with aqueous acid and cooling and so that losses due to solubility of the solvent in water are reduced. Examples of suitable solvents are hydrocarbons such as paraffins, olefins, cycloparaffins, monocyclic aromatic hydrocarbons such as benzene, toluene and xylene, and halogenated hydrocarbons such as halogenated paraffins and olefins, for example, carbon tetrachloride, perchlorethylene, ethylene dichloride, etc., halogenated cycloparaffins such as chlorocyclohexane, halogenated monocyclic aromatic hydrocarbons such as monochlorobenzene, ortho-dichlorobenzene, etc. We prefer to use monochlorobenzene. The organic solvent which is used should be liquid at the temperatures prevailing during the process. Its boiling point should be sufficiently high that the desired reaction takes place at a suitably rapid rate when the reaction mixture is refluxed at ordinary pressures. Usually organic liquids having a boiling point of from 70 to 200° C. are employed. Generally, the organic liquid carrier is employed in amount of from 100 to 200% by weight of the reactants.

It will be understood that the reactants, viz., the alkali metal salts of 2,4-dichlorophenol and monochloroacetic acid, are essentially insoluble in the organic liquid medium, and the reaction takes place almost exclusively in the aqueous phase of the reaction medium. The reaction medium ordinarily has an aqueous phase supplied by the water added with the aqueous sodium hydroxide, or supplied by the water of neutralization, or, if desired, water may be deliberately added to the reaction medium, although the latter expedient is ordinarily unnecessary. Preferably the reaction medium should contain as little water as possible because excessive quantities of water result in decreased yield. However, the aqueous phase is not absolutely essential in the present process, and, if desired the reaction medium may be anhydrous, as disclosed in copending application Serial No. 269,006 of Kulka and Warren, filed of even date herewith and assigned to the same assignee as the instant application. In such case, the free 2,4-dichlorophenol liberated in the exchange Reaction IV above exerts a solubilizing effect on the reactants so that they enter into, and readily react in the organic liquid carrier.

The reaction temperature conveniently is the boiling point of the reaction mixture, which may typically range from 70° to 140° C., depending upon the composition of the reaction mixture and the pressure. Usually it is preferred to employ essentially atmospheric pressure. It is preferred to use as high a temperature as is feasible in order to promote rapid reaction, and in some cases, as where the solvent is relatively low boiling, the reaction may be conducted under pressure in order to secure higher reaction temperatures. Preferably the reaction mixture is vigorously agitated during the process.

After completion of the reaction between the alkali metal salts of the reactants, the reaction mixture containing the sodium salt of 2,4-dichlorophenoxyacetic acid is cooled if necessary to bring the temperature thereof appreciably below 100° C., say to about 90° C., and then dilute acid, usually dilute sulfuric acid or hydrochloric acid, is added to precipitate free 2,4-dichlorophenoxyacetic acid from the reaction medium. The product may be removed from the reaction medium in any suitable manner, as by filtration or by centrifuging. The remaining liquid will contain 2,4-dichlorophenol, representing the excess free 2,4-dichlorophenol that was initially added to, or formed in, the reaction mixture, as well as 2,4-dichlorophenol formed from the unreacted alkali salt of 2,4-dichlorophenol upon acidification of the reaction mixture. Such unconverted 2,4-dichlorophenol remains dissolved in the organic liquid reaction medium, which may be recycled to the economy of the process. The remaining liquid after separation of the desired product will also have an aqueous layer resulting from the acidification with dilute aqueous acid, layer contains inorganic salts and other waste products that may be discarded.

The acidification of the reaction mixture is preferably conducted at a temperature which is sufficiently high that the reaction mixture is entirely liquid after acidification, i. e., so that no solidification of any of the components thereof takes place. The temperature at which the reaction mixture is acidified may conveniently range from 70 to 90° C. The acidified mixture is preferably cooled to a temperature below 60° C., and still more preferably to below 40° C., say down to room temperature or even lower, to effect precipitation of the 2,4-dichlorophenoxyacetic acid product. It is preferred to cool below 40° C. so that the balance of the solvent which is to be recycled does not have to be heated to avoid further precipitation. The lower the temperature to which the mixture is cooled, the more completely is the 2,4-dichlorophenoxyacetic acid thrown out of solution. However, the cooling should not be carried to so low a temperature that solidification of other materials present, especially water, takes place.

If desired, suitable provision may be made for purifying a portion of the recycled organic phase in order to keep the impurities in the system at a suitable low level. The purification of the recycled organic solvent may be accomplished in any desired manner, for example, by first distilling off the solvent and then the 2,4-dichlorophenol, the latter often being removed either by vacuum distillation or steam distillation. The organic phase can be recycled many times without purification.

The following examples illustrate the invention in more detail. All parts are by weight.

Example 1

To 326 parts 2,4-dichlorophenol (2 moles) dissolved in 1000 parts monochlorobenzene was added 85 parts flake sodium hydroxide (approx. 2.1 moles) and the mixture was warmed to reflux. When the neutralization reaction between the sodium hydroxide and the 2,4-dichlorophenol was complete, a warm solution of 95 parts monochloroacetic acid (approx. 1 mole) in 500 parts monochlorobenzene was added over a period of 15 minutes to the refluxing reaction mixture and the refluxing was continued for a further period of 1 hour. The mixture was then acidified with dilute aqueous sulfuric acid and cooled to 15° C., after which the precipitated 2,4-dichlorophenoxyacetic acid was separated from the mother liquors by filtration. The desired product was produced in a yield of 93% based on the monochloroacetic acid charged.

Example 2

A procedure identical to that of Example 1 was repeated, except that the monochlorobenzene was replaced by xylene, and the monochloroacetic acid solution was added over a period of 30 minutes. The yield was 93%.

From the foregoing it is evident that the invention provides a convenient and economical method for production of 2,4-dichlorophenoxyacetic acid. Because of the conditions prevailing in the reaction mixture when the monochloroacetic acid is added, there is little or no opportunity for this reactant to hydrolyze, with consequential loss in yield of the desired product. Because the required sodium monochloroacetate reactant is formed in situ by an exchange reaction between 2 moles of sodium 2,4-dichlorophenoxide and 1 mole of monochloroacetic acid, the procedure avoids exposure of the sodium monochloroacetate to alkaline conditions, thereby suppressing the undesirable hydrolysis Reaction III, above. In preparing the sodium 2,4-dichlorophenoxide, the amount of sodium hydroxide employed should therefore be sufficient to form at least 2 moles of the required sodium 2,4-dichlorophenoxide, but should preferably be insufficient to provide an excess of free sodium hydroxide during the addition of the monochloroacetic acid. This avoids exposure of the monochloroacetic acid or sodium monochloroacetate to sodium hydroxide which would favor Reaction III to the detriment of the yield. For the same reason, the neutralization reaction by which the sodium 2,4-dichlorophenoxide is formed should also be brought substantially to completion before the addition of the monochloroacetic acid is begun.

Having thus described our invention, what we claim and desire to protect by Letters Patent is:

1. In a process for preparing 2,4-dichlorophenoxyacetic acid by reacting sodium 2,4-dichlorophenolate with sodium monochloracetate and subsequently recovering 2,4-dichlorophenoxyacetic acid from the reaction mixture, the improvement which comprises the step of forming the sodium monochloroacetate required as a reactant in situ in an inert water-insoluble organic solvent for 2,4-dichlorophenol, said solvent being selected from the group consisting of hydrocarbons and chlorinated hydrocarbons, and said solvent having a boiling point of from 70° to 200° C. by mixing 1 mole of monochloroacetic acid and at least 2 molar equivalents of preformed sodium 2,4-dichlorophenoxide as such, thereby providing an equilibrium reaction mixture in which one molar equivalent of free 2,4-dichlorophenol as such is liberated for each molar equivalent of sodium monochloroacetate formed in situ and suppressing hydrolysis of the monochloroacetic acid to undesired glycollic acid by-product, and improving the yield of desired 2,4-dichlorophenoxyacetic acid.

2. The process of preparing 2,4-dichlorophenoxyacetic acid which comprises adding 2 moles of sodium hydroxide to at least 2 moles of 2,4-dichlorophenol dissolved in monochlorobenzene, subsequently adding 1 mole of monochloroacetic acid as such, heating the mixture at reflux temperature, acidifying the resulting reaction mixture, cooling the acidified mixture to precipitate 2,4-dichlorophenoxyacetic acid, separating the precipitate from the cooled reaction mixture, separating the residual liquid into an organic phase containing 2,4-dichlorophenol and an aqueous phase, and recycling said organic phase as a source of said 2,4-dichlorophenol, said sodium hydroxide being employed in amount sufficient to neutralize at least 2 moles of 2,4-dichlorophenol, and in amount not greater than necessary to neutralize the material to which it is added, thereby providing an equilibrium reaction mixture in which one molar equivalent of free 2,4-dichlorophenol as such is liberated for each molar equivalent of sodium monochloroacetate present.

JOHN C. R. WARREN.
MARSHALL KULKA.

References Cited in the file of this patent

UNITED STATES PATENTS

| Number | Name | Date |
|---|---|---|
| 2,480,817 | Warren | Aug. 30, 1949 |
| 2,511,784 | O'Neal | June 13, 1950 |
| 2,516,611 | Berhenke et al. | July 25, 1950 |